Nov. 15, 1960   L. HEDBOM   2,959,981
MECHANICAL DELAYING DEVICE
Filed July 1, 1958
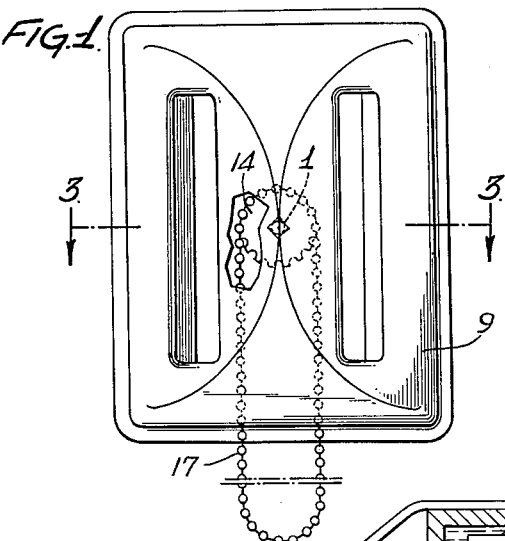
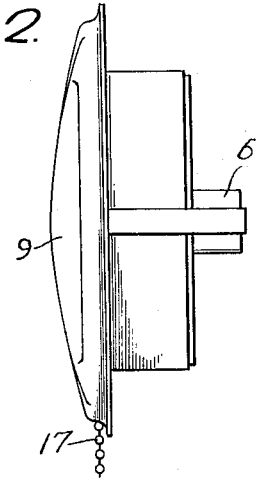
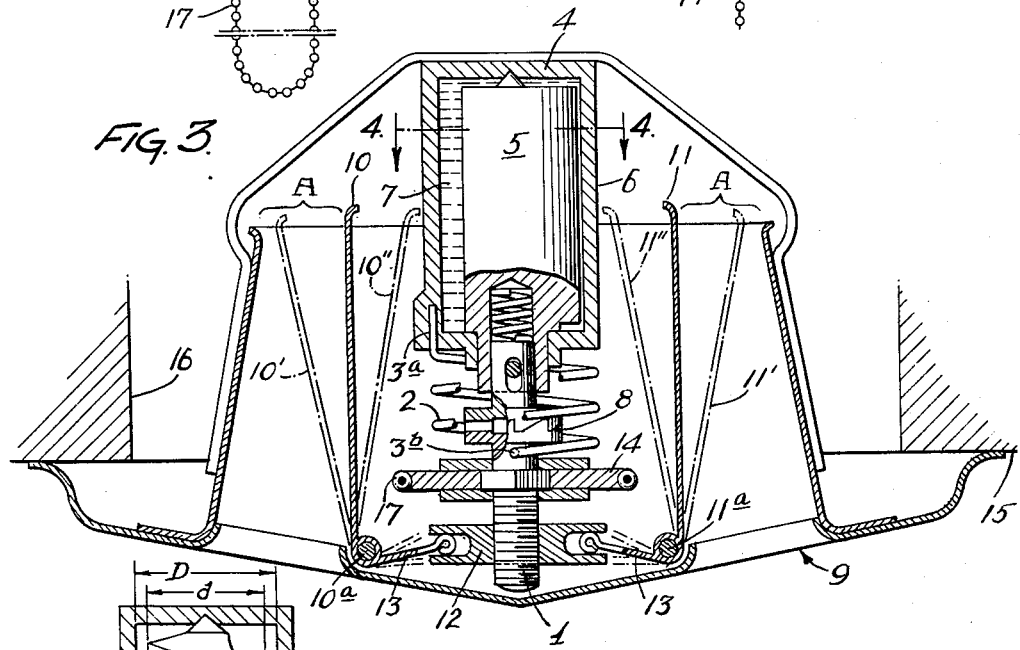
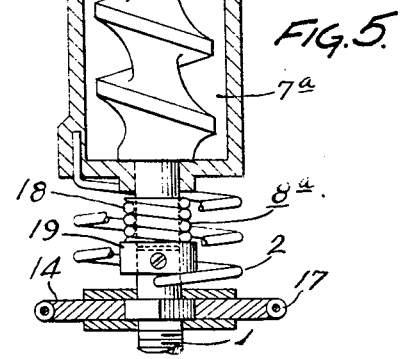
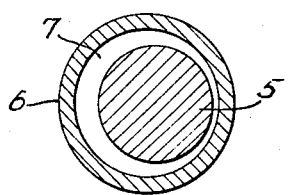
Inventor:
Lars Hedbom
by Howson & Howson
Attys 2,959,981
Patented Nov. 15, 1960

2,959,981
MECHANICAL DELAYING DEVICE

Lars Hedbom, Jonkoping, Sweden, assignor to AB Svenska Flaktfabriken, Kungsgatan, Stockholm, Sweden Filed July 1, 1958, Ser. No. 745,905

Claims priority, application Sweden July 3, 1957

3 Claims. (Cl. 74—504)

The present invention relates to a mechanical delaying device consisting of a turnably supported shaft, which against the action of a spring or a weight can be manually turned one or more times or less than one turn around its shaft, from which position the shaft, owing to the action of the spring or the weight, tends to return to its starting position and of a braking means connected with said shaft.

Mechanical delaying devices of different embodiments are used in many fields, for instance as door shutters, as means for turning on and off the light in stairs, etc. The present invention, the object of which is a new and improved construction of a mechanical delaying device, is—although not limited to said scope—intended to be used in a new field for such devices where earlier known embodiments have proved to be too expensive and unreliable in use. In order to facilitate mechanical ventilating of buildings with a great number of rooms by considerably decreasing the mean need for ventilating air for purposes of heat economy, the ventilating can be carried out in such a manner that rooms having a temporary need for ventilating air, are ventilated amply during the periods when there is such a need, whereas the quantity of ventilating air during the intervening periods is reduced to a minimum. In order to insure that the ventilating is carried out in the intended manner it is desirable to automatically change the quantity to minimum value by changing the flow passage area of the ventilating grilles.

The present invention which owing to its simple and reliable construction is especially suited for such cases of use and is characterized in that the braking means consists of an element rotating with the shaft and enclosed in a cylindrical casing filled with a plastic friction mass having a high viscosity, which element during the rotation is caused to agitate said mass. The rotating element can be made as a transport screw, the diameter of which with respect to the diameter of the casing being such that the mass transported by said screw may return along the periphery of the casing. This element can also be made as one or more bodies eccentrically located in the casing and rotating around the centre of said casing. In order to make it possible to carry out the manual change with less effort the braking means is preferably connected to the shaft by means of a clutch for disengaging the braking means during the manual turning of the shaft away from its starting position.

All of the objects of the invention and the various features and details of the construction and operation thereof are more fully set forth hereinafter with reference to the accompanying drawing wherein:

Fig. 1 is a front elevational view of the grille;

Fig. 2 is a side elevational view of the grille shown in Fig. 1;

Fig. 3 is a sectional view taken on the line 3—3 of Fig. 1;

Fig. 4 is a sectional view taken on the line 4—4 of Fig. 3; and

Fig. 5 is a fragmentary sectional view showing another embodiment of the braking means and clutch of the present invention.

In the drawing, reference number 1 designates a shaft mounted for manual rotation against the action of a spring 2 or other suitable bias. The spring 2 is fastened at one end to the shaft at the point 3b and at its other end to a stationary fastener at the point 3a. A braking means 4 is provided which consists of an element 5 rotating with the shaft 1, said element being enclosed in a cylindrical casing 6 filled with a plastic friction mass 7 having a high viscosity. During the rotation the element is caused to agitate said mass. In the embodiment shown in Figs. 1 to 4, the rotating element 5 consists of an eccentric body rotatable in the casing 6. In the embodiment illustrated in Fig. 5 the rotating element is made as a transport screw 5a, the diameter d of which is so chosen with respect to the diameter D of the casing 6a that the mass 7a transported by the screw may return along the periphery of the casing. Reference number 9 designates a valve or grille with two openings A, the flow passage area of which is varied by means of adjustable valve blades 10 and 11, being turnable around their shafts 10a and 11a respectively. Reference number 12 designates a non-rotatable guide washer for the adjusting of the valve blades 10, 11 and is designed as a nut displaceable on a threaded part of the shaft 1. The rotation of the shaft 1 is carried out by means of a chain wheel 14, manually operated by a chain 17 arranged around the periphery of said wheel. Item 15 designates a wall, provided with a ventilating duct 16.

The function of the device illustrated is as follows. It is assumed that the valve blades normally take the position 10', 11', corresponding to the calculated quantity of minimum air. When an occasional increase of the quantity of ventilating air is desired, the valve blades 10 and 11 respectively are adjusted to a position 10" and 11" respectively, corresponding to the maximum quantity of air. The valve blades are in the drawing shown in an intermediate position. This adjustment is carried out by turning the chain wheel 14 by means of the chain 17, whereby the washer 12 is caused to move further away from the chain wheel 14. During the movement of the washer the branches 13 of the two valve blades are actuated and the valve blades take different positions.

During the turning of the shaft the spring 2 is tightened while the braking means which is connected to the shaft remains unactuated owing to the influence of the clutch 8. In the embodiment of Figs. 1–4, the clutch consists of a coupling with double toothed plates, but the coupling can suitably be made as shown in Fig. 5 as a simple friction coupling 8a formed as a helical spring 18 fastened to one end of the shaft and enclosing the other end of the shaft, which spring during the turning in one direction is pressed against the last mentioned end of the shaft and the free end of which is arranged to be pressed and locked against a sleeve 19 arranged on said shaft. As soon as the turning of the chain wheel 14 has ceased, the spring 2 tends to return the shaft to its starting position. During this return the rotating element 5 takes part in the movement and thereby causes an agitating of the plastic friction mass 7, resulting in a reduced rotation speed for the shaft 1. Thus the valve blades 10 and 11 are forced by the steering washer 12 to automatically return to their starting positions 10' and 11' respectively. By choosing a suitable friction mass and suitable dimensions for the rotating element the time for the return can be varied within wide limits.

Modifications can be made within the scope of the filed claims, for instance by making the shaft 1 stationary and arranging the valve blades to be actuated by the casing 6, which in this case rotates. Independent of the embodiment used it is essential for the function of the device that the viscosity of the used friction mass is to as great extent as possible independent of the temperature within the temperature limits, intended for the use of the device. For cases where it can be assumed that the delaying device is nearly always functioning, thus involving a risk of heating the mass by friction work, the embodiment disclosed in Fig. 5 is especially suitable. Since the mass in this embodiment is continuously carried to the periphery of the casing and is cooled there, the increase of the temperature will become unimportant.

What I claim is:

1. A mechanical delaying device comprising a generally cylindrical casing, a shaft positioned coaxial with said casing mounted for manual rotation about the axis of said casing, resilient spring means interconnected with said shaft and said casing normally urging said shaft to a predetermined position, an element rotatably mounted within said casing for rotary movement about an axis concentric with the axis of said casing, said casing being filled with a plastic friction mass having a high viscosity operable to deter rotation of said element, ratchet means interconnecting said element and said shaft operable to permit free movement of the shaft relative to said element upon rotation of said shaft in one direction away from said predetermined position and cause rotation of said element with said shaft upon rotation of said shaft in the opposite direction toward said predetermined position, manually operated means interconnected with said shaft operable to rotate said shaft in said one direction away from said predetermined position, an internally-threaded axially movable member positioned about said shaft mounted for axial movement relative to said shaft between opposite limit positions, and threaded means interconnecting said shaft and said member to fix the axial position of said member in accordance with the predetermined position of said shaft, and operable upon rotation of said shaft in said one direction away from said predetermined position to move said member toward one of said limit positions and upon rotation of said shaft in said opposite direction toward said predetermined position to move said member toward said other limit position.

2. A device according to claim 1, characterized in that the rotating element consists of a transport screw, the diameter of which with respect to the diameter of the casing being such that the mass being transported by said screw may return along the periphery of the casing being such.

3. A device according to claim 1, characterized in that the rotating element comprises at least one body eccentrically located in the casing and rotating around the centre of said casing.

References Cited in the file of this patent

UNITED STATES PATENTS

| | | |
|---|---|---|
| 765,396 | Neuberth | July 19, 1904 |
| 1,269,606 | Hovas | June 18, 1918 |
| 2,054,502 | Hallett | Sept. 15, 1936 |
| 2,705,631 | Reichold | Apr. 5, 1955 |
| 2,707,796 | Hawks | May 10, 1955 |

FOREIGN PATENTS

| | | |
|---|---|---|
| 18,790 of 1900 | Great Britain | Oct. 30, 1900 |
| 626,355 | France | May 9, 1927 |